United States Patent [19]

Grube

[11] Patent Number: 5,081,829
[45] Date of Patent: Jan. 21, 1992

[54] POWERED EDGER

[76] Inventor: Walter Grube, 5749 Riverside Dr., Cape Coral, Fla. 33904

[21] Appl. No.: 660,721

[22] Filed: Feb. 25, 1991

[51] Int. Cl.⁵ .......................................... A01D 34/00
[52] U.S. Cl. .................................................... 56/256
[58] Field of Search ............... 56/229, 231, 255, 256, 56/295, 17.1

[56] References Cited

U.S. PATENT DOCUMENTS

| 3,812,917 | 5/1974 | Strate ................................ 56/256 X |
| 4,907,404 | 3/1990 | Oliver et al. ............................ 56/256 |
| 4,962,631 | 10/1990 | Braun et al. ........................... 56/17.2 |

*Primary Examiner*—Thuy M. Bui
*Attorney, Agent, or Firm*—Alfred E. Wilson

[57] ABSTRACT

On golf courses it is common practice for the golf club to provide carts for the golfers who wish to use them to go from one golfer's stroke to the next. When tournaments are held large crowds walk along one side of the golf course fairways of the course to observe the various strokes taken by the golfers who are participants in the tournament. To provide walkways for the tournament observers, and for the golfers who use carts many courses have walkways for the carts and for the guests and observers watching the tournaments. These walkways are generally formed of asphalt, which is easy for golfers who have spiked shoes to walk on. To present a neat, well kept appearance it is necessary to keep the grass trimmed to the edges of these walkways. This is a time consuming and laborious job that must be done by experienced and skilled workers. I have devised a Gravity Actuated Edger having a large diametered sharpened disk wheel to roll along on the walkway about an inch or so from the edge of the asphalt walkway to cut the grass that encroaches onto the walk ways. To pull the loose grass from behind the cutting blade, I have found that a vertically mounted revolving round brush, preferably made of wire, positioned closely in back of the cutting disk is very effective in pulling the loose grass from in back of the cutting blade. A neat appearance of the cart path is thus insured. This improved Edger is also excellent for edging bicycle riding paths.

9 Claims, 2 Drawing Sheets

POWERED EDGER

BACKGROUND OF THE INVENTION

Heretofore it has been common practice to cut the grass back about an inch from the edge of the asphalt cart path or walkway. That required a lot of hand work, and it is difficult to keep the entire areas along the asphalt walkways looking uniform.

Golf courses are very extensive, the smallest having at least two nine hole courses wherein each nine hole course has 2,000 to 3,500 yards of fairways, some of which are lined with trees on one or both sides from the tees where the golfers "drive off" from to the greens where they "hole out". On many of the larger courses where tournaments are played a vigorous effort is made to have the courses looking uniform and well kept throughout. This requires a lot of careful work done by several men experienced in golf course care. The fairways are fertilized and watered to keep the grass growing, and to insure a good appearance. The fairways are mowed frequently, and an effort i made to have the entire course give the impression of being well kept.

1. Field of the Invention

The field of the invention is to have the asphalt walkways along the edges of all of the fairways throughout the entire golf course looking uniformly trimmed, and preferably having the grass run up to the edge of the asphalt walkways but not to be straggling over the surface of the walkways of the golf courses, and bicycle riding paths. Being in alignment with the edges of the asphalt walkways, the fairways present a highly desirable appearance throughout the entire golf course or bicycle riding paths.

2. Description of the Related Art

Heretofore efforts have been made, by the use of powered Edgers to attempt to maintain a degree of alignment and uniformity of the edges of the grass with the surface of the asphalt walkways. In view of the long distances between the areas where the golfers "tee off from" to the Greens, it is virtually impossible to consider using electric edgers because of the long distances that the electric lines would have to extend to. It has been found that gasoline powered edgers do not provide the delicacy and precision of operation that is desired to maintain the edges of the asphalt walkways in golf courses, and the edges of bicycle riding paths in proper condition.

SUMMARY OF THE INVENTION

After extensive experience in the maintenance of golf courses, including the asphalt walkways . golf courses and on bicycle ride paths, I have devised a simple and very effective gravity activated device for accurately maintaining the asphalt walkways in golf courses and bicycle riding paths in excellent condition.

I employ a large diametered sharpened rotatable disk mounted on a lever arm carried by a small tractor in such a manner that the weight of the cutting blade and its supporting members and auxiliary weights if needed are operable to exert a sufficient cutting force to cut grass and other foliage as the rotatable disk is rolled along the edge of the asphalt walkways. I prefer that the cutting edge of the rotatable disk run along the edge of the asphalt walkway about an inch from the outer edge of the walkway to cut the grass and other foliage that is encroaching thereon. If desired additional weights as needed can be added to increase the foliage cutting ability of the disk.

I provide a small rotatable vertically mounted circular wire brush of approximately six inches in diameter, positioned to bear lightly on the outer edge of the asphalt walkway, and free floating vertically to the extent of about two inches and rotating at approximately 1,000 to 1,500 RPM to pull the grass and other vegetation that is growing along the edge of the walkway.

BRIEF DESCRIPTION OF THE DRAWINGS

In the drawings wherein similar parts are identified by the same reference numerals throughout the several views:

FIG. 4 is a side elevation of a three wheeled tractor, one of the types of three or four wheeled tractors that my improved edger can be mounted on.

DESCRIPTION OF THE PREFERRED EMBODIMENT

Figure 1:
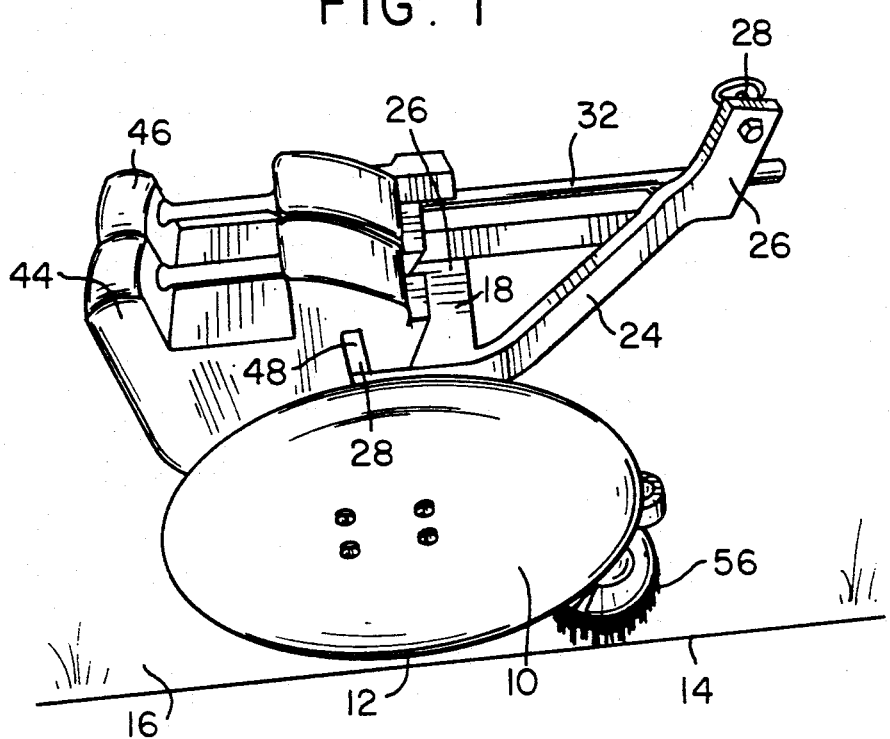
FIG. 1 is a perspective view of my improved Edger from the upper right hand side thereof.

Referring now to the drawings, FIG. 1 is a perspective view of the pathway edger having a large disk with a sharpened edge 10 freely rotatably carried by a hub 12 (FIG. 3) and is rotatably mounted to run along about an inch from the outer edge 14 of the hard surfaced asphalt walkway 16.

Figure 3:
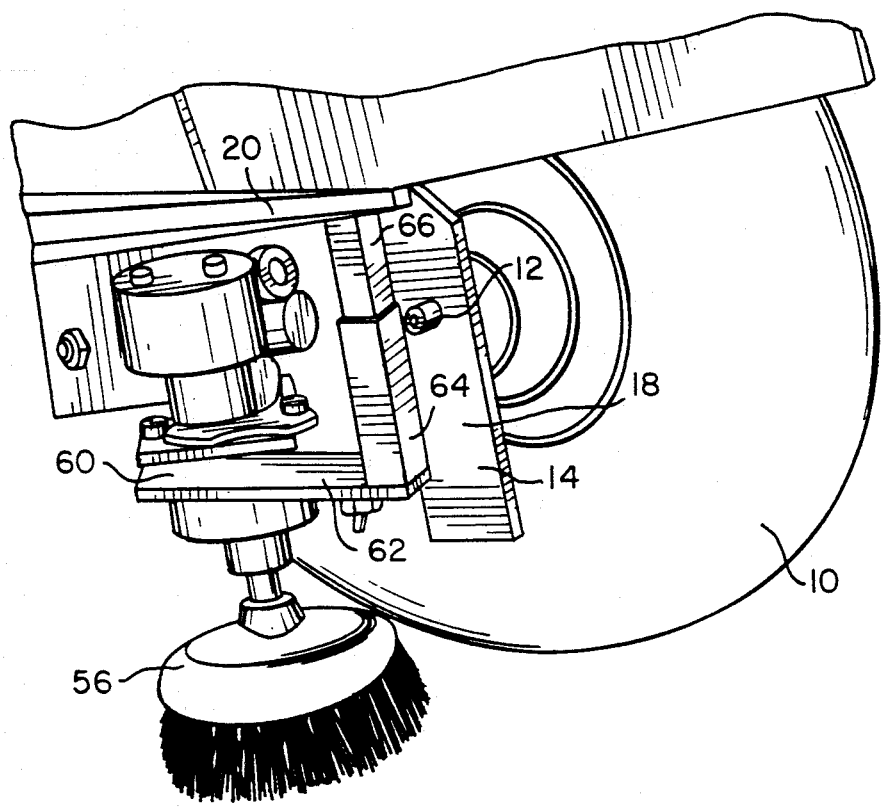
FIG. 3 is a view from the front inside of the Edger showing the location of the vertically mounted free floating brush relative to the cutting disk.

The hub 12 which supports the large disk 10 can be carried by any commercially available wheel supporting structure, such for example as the hub carrying member 18 as best seen in FIG. 3. The disk carrying member 18 is secured to a horizontally disposed transversely extending flat plate 20 secured at one end to the top of the hub carrying member 18. The vertically disposed member 22 is elongated, and has an angularly inclined section 24 which terminates in a section 26 substantially in alignment with the disk 10, and having an aperture connected through a stud 28 to the tractor illustrated in FIG. 4 which can be of any suitable three or four wheeled tractor operably connected to the Edger.

Figure 2:
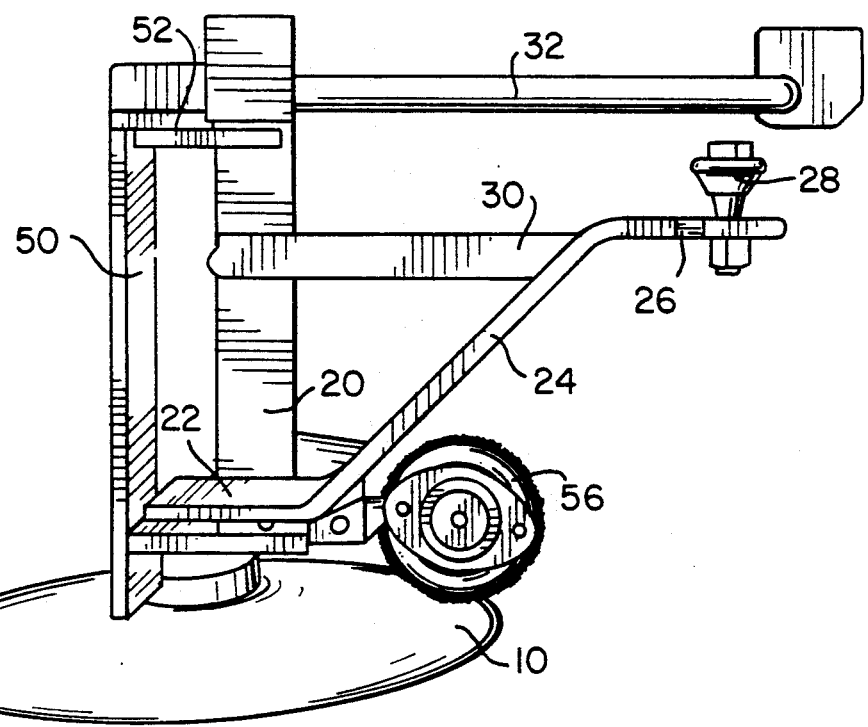
FIG. 2 is a plan view of the device.

As more clearly illustrated in FIGS. 1 and 2 the portion 24 of the vertical member adjacent the rearwardly extending portion 26 thereof is provided with a reinforcing member 30 (FIG. 2) extending to the flat transversely extending member 20 to provide a rigid triangular disk supporting structure 20, 24 and 30 to provide adequate support for the disk 10.

Figure 4:
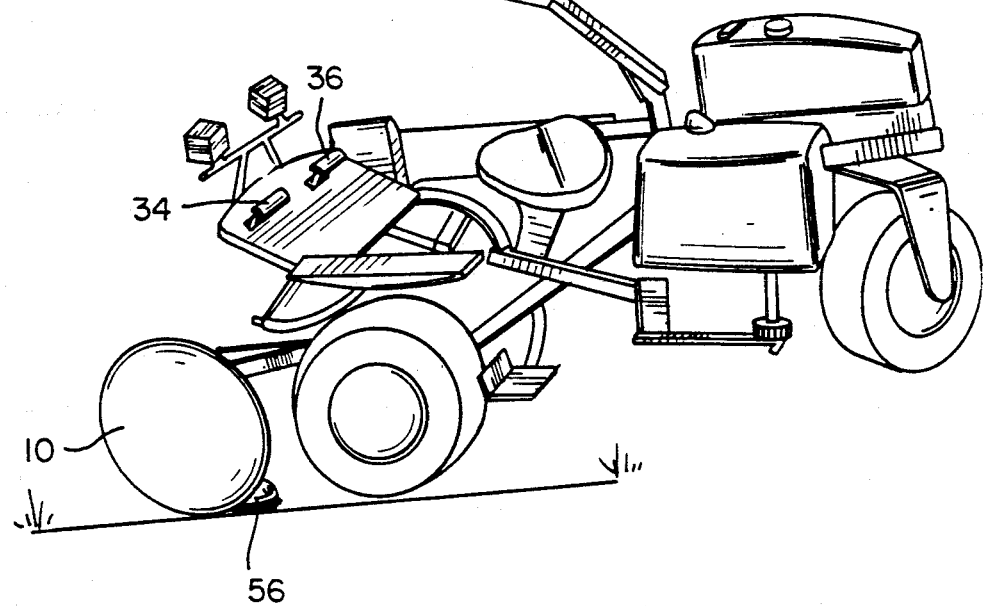

The bar 32 carried by the tractor, engages under the end of the flat plate 20 to elevate the edger, about the stud 28 when the left hand pedal 34 of the tractor shown in FIG. 4 is depressed. The right hand pedal 36 operating to lower the edger to the operative position where the weight of the disk and its supporting structure is exerted on the disk 10. The power to lift the edger is provided by the three wheeled tractor illustrated in FIG. 4 to which the Edger is attached.

In the event that the cutting disk 10 and its supporting structure does not have sufficient weight to cut the grass and other vegetation that is encroaching on the asphalt cart path 16, weights 44 and 46 having slots 48 in their contoured portions near the front of the weights 44 and 46 to hook over and engage the vertical reinforcing plate 50 (FIG. 2). The reinforcing plate 50 is welded or otherwise secured to a reinforcing member 52 secured as by welding between the flat plate 20 and the vertical plate 50.

To pull out any grass or other vegetation that may have been partially cut or is entangled with grass that has been cut, and to clear the grass and other vegetation from the area of the cutting disk 10 a vertically mounted brush 56 preferably having wire bristles is mounted to rotate, preferably in the clockwise direction closely adjacent to the back, cut side of the disk 10 to pull out any partially cut grass and other vegetation from the cut side of the disk 10.

The brush 56 as more clearly illustrated in FIG. 3 is preferably a wire bristle brush, mounted for clockwise rotation, and driven preferably by a fluid pressure actuated oil drive unit to rotate at approximately 1,000 RPM to 1,500 RPM.

The brush 56 may be mounted on a flat plate 60 having an extension 62 which supports a rectangular member 64 slidably mounted in a smaller rectangular member 66 secured at the upper end to the flat transversely extending member 20. With this construction the longitudinally extending bristles of the brush 56 will at all times extend substantially perpendicularly to the surface of the carpath, and will do a good job of pulling out any partially cut or entangled vegetation.

In the event that a walkway has not been treated for a relatively long period of time, and in instances where the asphalt is relatively thin, the grass and other vegetation may grow up through the asphalt. In that circumstance I have found that by positioning a second brush adjacent the brush 56 and extending towards the middle of the cart path, the second brush being driven by the same mechanism that drives the brush 56, a very good job is achieved of pulling out any such vegetation and clearing the walkway free from grass and other vegetation.

The dimensions of the rectangular member 64 and 66 slidably mounted relative to each other is preferably approximately 1¼" for the larger vertically extending member 64 carried by the extension 62 of the plate 60 which carries the brush 56, and the upper square tube 66 is secured to the plate 20 may for example be 1¼" square. It will be understood that securing members are provided to prevent the brush 56 and its associated members from falling out of the assembly when the Edger is not in use.

I claim:

1. In a golf course having driving tees from which the golfers "tee off from" toward greens spaced from the driving tees and where the golfers "hole out," spaced fairways between each of the driving tees and its associated green, asphalt walkways having edges and central areas leading along the fairways from each driving tee to its associated "green", a rotatable cutting disk adapted to be guided along the edges of the walkways to cut grass and other vegetation along the edges of the walkways, and a rotatable brush having vertically extending bristles in free floating contact with the walkway to pull grass and matted vegetation has been partially cut and direct it towards the center of the walkway.

2. Hard surfaced walkways having edges and central areas, a rotatable cutting disk adapted to be guided along the edges of the walkways to cut grass and other vegetation along the edges of the walkways, a rotatable brush having vertically extending bristles in free floating contact with the walkways at the discharge side of the cutting disk to pull out grass and matted vegetation some of which will have been partially cut and direct it towards the center of the walkway.

3. The invention defined in claim 1 wherein the disk is suspended on a fulcrum spaced from the cutting edge of the disk.

4. The invention defined in claim 1 wherein removable weights are suspended to increase the loading exerted by the rotatable disk.

5. The invention defined in claim 1 wherein the brush is rotatable in the clockwise direction.

6. The invention defined in claim 1 wherein the brush in positioned adjacent the cut side of the disk and is free floating vertically to pull partially cut and matted vegetation and discharge it toward the center of the walkway.

7. The invention defined in claim 2 wherein the large diametered rotatable disk is hingedly mounted on a fulcrum spaced longitudinally from the point of contact of the cutting disk with the walkways, and removable weights to increase the loading exerted on the rotatable disk.

8. The invention defined in claim 2 wherein non-circular telescoping members mounted perpendicularly to the axis of the cutting disk are provided to control the movement of the brush.

9. In a hard surfaced bicycle path having edges and central areas, a gravity actuated edger for cutting grass and foliage encroaching on the bicycle path, a large diametered sharpened disk adapted to roll along bicycle path approximately an inch from the edge of the bicycle path to cut grass and other foliage encroaching on the bicycle path, a vertically disposed rotatable brush adapted to pull out partially cut grass and foliage from the inside at the cut side of the disk and discharge it towards the center of the bicycle path.

* * * * *